Jan. 29, 1924.
R. H. BULLEY
1,481,828
APPARATUS FOR TREATING METALS
Original Filed April 24, 1916
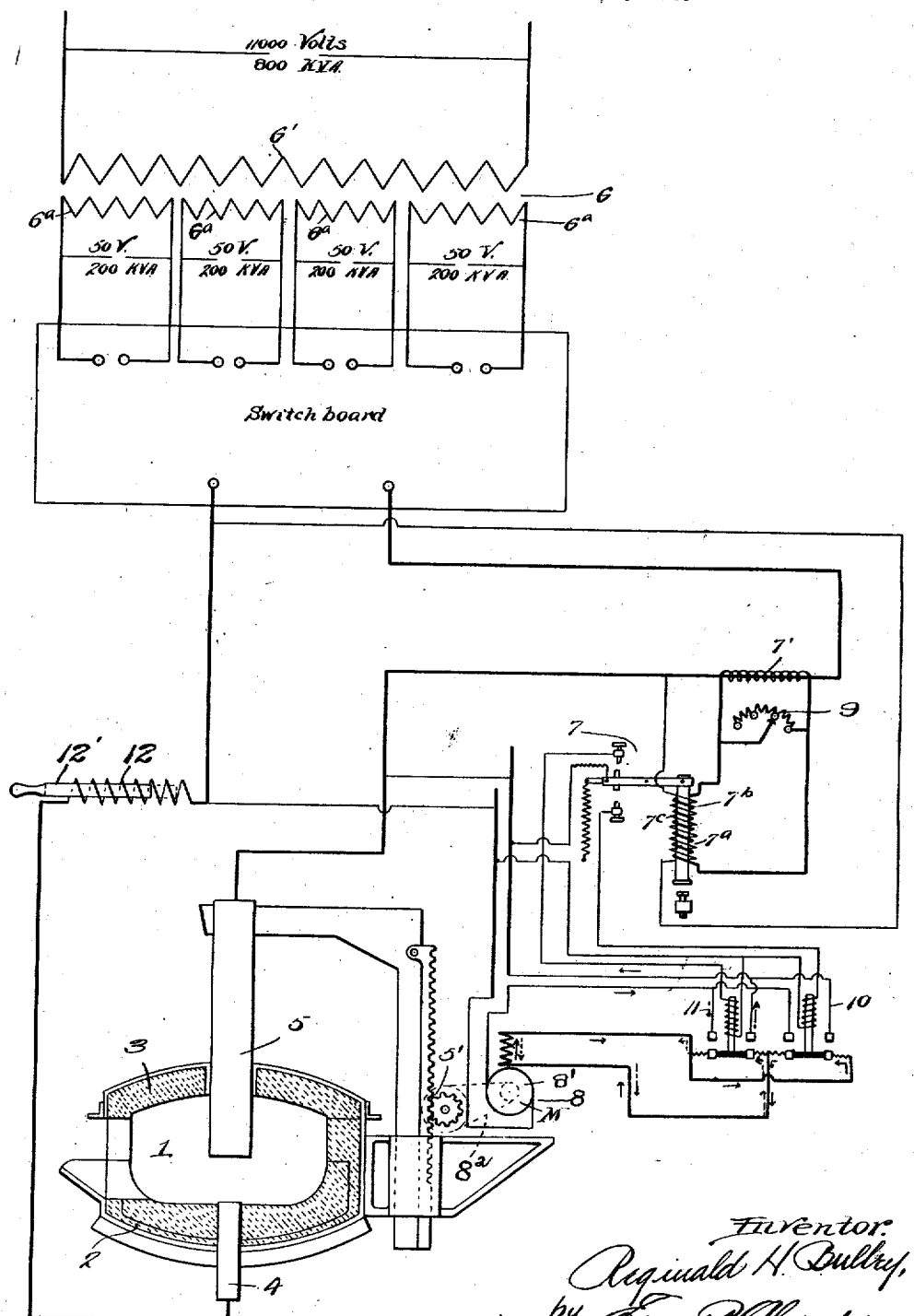

Patented Jan. 29, 1924.

1,481,828

UNITED STATES PATENT OFFICE.

REGINALD H. BULLEY, OF SYRACUSE, NEW YORK.

APPARATUS FOR TREATING METALS.

Original application filed April 24, 1916, Serial No. 93,070. Divided and this application filed February 8, 1918, Serial No. 216,100. Renewed March 21, 1922. Serial No. 545,570.

*To all whom it may concern:*

Be it known that I, REGINALD H. BULLEY, a citizen of the United States, residing at Syracuse, in the county of Onondaga and State of New York, have invented certain new and useful Improvements in and Relating to Apparatus for Treating Metals, of which the following is a specification.

This invention relates to apparatus for treating metals by the use of an electric arc. More particularly it has to do with apparatus for treating, melting and refining metals and metallic alloys.

One of the objects of my invention is to overcome the difficulties experienced in actual practice with the use of the electric arc in existing types of electric furnaces, and more particularly those in which the basic process of refining iron and steel is carried out. With certain of the electric metal refining furnaces of the electric arc type, which are now in use, it has been found advisable to introduce into the furnace the metal in a molten condition, in view of the fact that the relationship of the arc electrodes and construction of the furnace generally do not seem to lend themselves to the efficient and economic melting of the metal from its solid state. For example, with the Heroult type of electric arc furnace, it has been found advisable, in many instances, in order to operate it most economically on basic steel process, to introduce metal in the molten state into the furnace and then subject it to the influences of an electric arc of a comparatively low voltage. This voltage substantially limits the length of the arc, and a current of relatively high amperage is initially required properly to refine the bath in the furnace. After the metal in the Heroult furnace is treated with a current of high amperage and relatively low voltage for the required period of time, then the value of current flowing is materially reduced, the voltage remaining substantially the same as it was at the beginning of the process. This type of furnace has been found to be relatively slow in operation and uneconomical in current consumption unless the metal is introduced into it in the molten state, as above stated. Heretofore, in order to overcome some of the objections to the Heroult type of electric arc furnace, it has been suggested to start melting the metal from its solid state under the influence of an electric arc which was relatively longer and of higher voltage than that used by Heroult, and further that after the metal had been subjected to the influence of the relatively longer arc of relatively higher voltage for a given time, the kilowatt load of the work circuit including the electric arc should be reduced. With this latter type of furnace in actual practice it has been found that the melting capacity is materially increased over that of the Heroult type, but other difficulties have been encountered with it, not present in the Heroult type. For example, with a relatively longer arc of comparatively high voltage, undesirable heating and melting of the cover or top and lining of the side walls of the furnace has been experienced, and when the kilowatt load was dropped, the refining action of the furnace was not satisfactory and particularly was this true with various metallic alloys of iron and steel.

With my improved apparatus the objection to slowness and expense of melting encountered with the Heroult process is overcome, the objection heretofore incident to the systems of electric furnace operation in which regulation is effected merely by reducing and increasing the length of the arc, or varying the kilowatt load of the work circuit, either or both, are also overcome, and in addition thereto my invention provides for more efficient and economical refining than results from the use of any of the earlier types of electric arc furnace for metal melting and refining purposes and control apparatus of which I am aware.

A further object of my invention is to provide apparatus with which it is possible readily to make the various steps essential to the proper treating, melting and refining of metals by the use of an electric arc, in a simple, efficient and economical manner, it being possible for one skilled in the art to accomplish the necessary electric circuit regulation promptly at will, and substantially automatic regulation likewise being possible.

For the purpose of setting forth one embodiment of my invention I have selected herein to illustrate and describe a construction of apparatus and system of correlated elements by means of which it may be practiced.

This application is a division of my application Serial No. 93,070, filed April 24, 1916.

The drawing illustrates diagrammatically apparatus embodying my invention.

1 indicates an electric furnace of any desired construction. It is shown as having a shell 2, of insulating material, and top or roof 3. The insulating lining and top 3 may be of any desired composition capable of meeting the chemical, temperature and structural requirements of a furnace of this character. The electrodes within the furnace may be of any desired construction, number and disposition. 4 is an electric terminal or conductor which extends up through the bottom of the furnace and makes electric contact with the metal to be treated therein, which metal constitutes, in this example, the lower electrode, the upper one 5 of which extends through the top of the furnace and is adjustable up and down relative to the lower electrode and the bottom of the furnace in any well known manner, as by means of a rack and pinion mechanism 5′. I prefer at the present time to make the electrode 5 of amorphous carbon or graphite, though any suitable composition of material will suffice. When the metal is introduced into the furnace and contacts with the terminal 4, the metal and the terminal 4 may be considered together as constituting the lower electrode, if desired.

6 represents diagrammatically a step down transformer, the primary winding 6′ of which is connected in a well known manner with a suitable source of electric energy, not shown. This transformer may be provided with any desired number of secondary windings 6ª. For the purpose of illustration I have shown four such secondary windings. Each of these secondary windings may be of any desired characteristic so long as any combination of them will produce in the total secondary circuit the full kilowatt capacity of the primary winding 6′, that is when said windings are connected either in series, series parallel or parallel.

7 represents diagrammatically a kilowatt regulator of any preferred construction suitably connected with operating mechanism 8 for the upper electrode 5, which operating mechanism may be an electric motor 8, suitably geared to the rack and pinion mechanism 5′,—as by chain reduction gearing 8ª indicated in dotted lines—the operation of the kilowatt regulator 7 being such that when the kilowatts in the circuit exceed the predetermined value for which the regulator is adjusted, the regulator will operate to connect the motor in circuit and raise the electrode 5 the required distance to bring the kilowatt load in the circuit back to the predetermined value, whereas when the kilowatt load in the circuit is less than the predetermined value, the regulator will operate to actuate the motor so as to lower the electrode 5 until the kilowatt load in the circuit has the predetermined value. 7′ is a series or current transformer, the function of which is to supply current to the solenoid 7ª which consists of a winding 7ᵇ connected in series with the current transformer 7′ and a winding 7ᶜ connected across the line to the electrodes in such a manner that the current flowing in this winding will be proportional to the voltage with which the line to the electrodes is supplied. The coils 7ᵇ and 7ᶜ are so wound as to supplement each other, that is to say, that an increase of voltage across the line produces an increase of current flowing in 7ᶜ in the same direction that an increase of current in the line will produce an increase in the secondary transformer 7′ and winding 7ᵇ.

10 and 11 are electro-magnetic switches, the circuits of which are subject to the control of the master solenoid 7ª, the switch 10 serving to close the motor circuit so as to cause the motor armature to rotate in one direction, whereas the switch 11 is adapted to close the circuit so as to cause the armature to rotate in the opposite direction. When the magnetic switch 10 is energized, the direction of flow of current through the field coil of the motor is indicated by full line arrows, whereas when the magnetic switch 11 is energized to close the motor circuit, the direction of flow of current through the motor field is indicated by dotted arrows.

The control of the voltage of the total secondary circuit, including the circuit between the electrodes in the furnace, as provided for by the transformer 6, may not under certain conditions of the furnace and characteristics of the metal being treated, be sufficiently flexible for obtaining the results desired, and I have therefore provided for a further regulation of the kilowatt load of the circuit which may be effected as desired, dependent upon the conditions of the metal being treated and the refining results sought. With this object in view I have provided a variable resistance 9 of any desired construction for the kilowatt regulator 7. This regulating resistance 9 serves to regulate the current flowing to the coil 7ᵇ of the solenoid 7ª by shunting off a portion thereof as determined by the amount of resistance introduced in the shunt circuit. Since the current given by the series transformer is always proportional to the amount of current flowing through the furnace, if it becomes necessary to adjust the amount of current passing through the furnace under given conditions, it is most easily done by varying the resistance 9 and thereby changing the amount of current which flows through the solenoid for a given amount of current in the line. The operative may within limits regulate the kilowatt load of the circuit by cutting in or out resistance in circuit with the kilowatt regulator as desired. While I have for the purpose of illustration shown a variable resistance for the purpose of accomplishing this regulation, it will be understood that it may be accomplished within desired limits in any well known manner, as for example, by any sort of mechanical adjustment of parts of the kilowatt regulator itself.

In operation, the metal or metallic alloy to be treated may be introduced into the hearth of the furnace 1 in any well known manner and in any desired condition. As previously stated, my invention is peculiarly adapted for efficiently melting the metal from the solid state, but if desired, the metal may be introduced into the hearth in the molten state. The desired character and quantity of slag or slag forming materials may be introduced into the furnace at this time or later during the operation as desired.

The coils of the secondary circuit preferably are first suitably connected in series. Assuming that the kilowatt capacity of the source of supply is 800 kilowatts and that each of the secondary windings is wound for fifty volts and has a capacity of 200 kilowatts, at the beginning of the process these secondary coils are connected in series by any well known connecting devices, (not shown), so that the voltage of the secondary circuit will be 200 volts and the kilowatt load 800 kilowatts. In order to start the arc between the lower end of the electrode 5 and the metal on the hearth, it may be necessary initially to depress the electrode 5 until the arc is established, whereupon the electrode 5 is raised until the maximum kilowatt load of the circuit is established or substantially so, at which time the kilowatt regulator 7 may be connected into the circuit to assist in substantially maintaining fairly constant the maximum kilowatt load on the circuit. At this time the length of the arc between the bottom of the electrode 5 and the top of the material in the furnace being treated, may be considered to be about medium.

After proceeding with the voltage at 200 volts and the kilowatt load substantially 800 kilowatts for the period of time required to get the material being treated in the desired condition, as determined by the condition of the furnace and nature of the metal being treated, I next lower the voltage of the working circuit, say to 100 volts, maintaining, however, the kilowatt load of the circuit substantially the same as before, namely 800 kilowatts. With the apparatus illustrated in the drawings, this may be accomplished by connecting any pair of the secondary windings 6ᵃ in series and that pair in parallel with any other pair of the secondary windings, similarly connected, which connections may be made electrically in any well known manner (not shown). At this time the kilowatt regulator 7 may require adjustment to accommodate it to the new voltage condition of the circuit in order that it may maintain the kilowatt load of the circuit substantially the same as it was during the first step. And at this time, furthermore, the electrode 5 may have to be lowered relative to the bath of molten metal so that the expenditure of energy of the secondary circuit in the furnace and between the electrode and bath will be such as to radiate more heat to the bath than was the case when the arc was longer, the voltage higher, and the current flowing in the circuit of less amperage. The shorter the arc, the farther it is relatively from the top of the furnace, and the less destructive is its effect upon the top, the mass of the electrode itself cutting off the radiation of the heat from the arc to the top more effectively as the arc is shortened in length.

The action of the relatively lower voltage and shorter arc on the metal of the bath is continued until the refining has been carried on to the desired point as determined by the character and nature of the material being treated and the results desired; during the course of this refining, it may be found advisable to vary the kilowatt load of the circuit within limits, and this may be accomplished by the operative operating the resistance 9 for effecting the action of the kilowatt regulator 7. As much as sixty per cent regulation in this particular may be found necessary.

It may be found advisable in certain instances to still further reduce the voltage, say for example to fifty volts without materially changing the kilowatt load of the work circuit. This may be accomplished by connecting four of the secondary windings 6ᵃ in parallel in the work circuit and the adjustment of the electrode 5 and of the kilowatt regulator 7 to establish the requisite arc on the one hand and the adjustment of the kilowatt regulator 7 on the other substantially to maintain the constant kilowatt load desired.

Under certain circumstances, it may be advisable to introduce into the work circuit a reactance, the function of which will be to have a smoothing out or ballasting action in the work circuit. This may readily be accomplished as by connecting in the work circuit a reactance of any well known construction indicated diagrammatically at 12 in the drawings. This reactance 12 may be provided with regulating means 12' of any well known construction, also shown diagrammatically, for varying its capacity as desired. The same results, of course, could be obtained by connecting in the work circuit a suitable resistance, but the energy losses due thereto would be objectionable and disadvantageous as compared with those incident to the use of the reactance just referred to.

To those skilled in the art of making apparatus of the class described, many modifications of and widely differing embodiments and applications of my invention will suggest themselves, without departing from the spirit and scope thereof. My disclosures and descriptions are purely illustrative and are not intended to be in any sense limiting.

What I claim is:

1. In apparatus for treating metal by the use of an electric arc, the combination of a pair of electrodes, one of which is movable relatively to the other one, and means for delivering to said electrodes when positioned for a relatively long arc a given kilowatt load, and then substantially the same kilowatt load with reduced voltage and increased amperage when the electrodes are positioned for a shorter arc.

2. In apparatus for treating metal by the use of an electric arc, the combination of a pair of electrodes, and means for adjusting one of said electrodes relative to the other and maintaining the kilowatt load of the circuit across said electrodes substantially constant at different adjustments of said electrodes with decreased voltages and increased amperages as the length of the arc is decreased.

3. In apparatus for treating metal by the use of an electric arc, the combination of a pair of electrodes, means for adjusting one of said electrodes relative to the other, and means for maintaining the kilowatt load in the electrode circuit substantially constant at different adjustments of said electrodes with decreased voltages and increased amperages as the length of the arc is decreased.

4. In apparatus for treating metal by the use of an electric arc, the combination of a pair of electrodes, one of which is movable relatively to the other one, means for delivering to said electrodes when positioned for a relatively long arc a given kilowatt load, and then substantially the same kilowatt load when the electrodes are positioned for a shorter arc, and means for varying the kilowatt load within relatively narrow limits.

5. In apparatus for treating metal by the use of an electric arc, the combination of a pair of electrodes, one of which is movable relatively to the other one, means for delivering to said electrodes when positioned for a relatively long arc a given kilowatt load, and then substantially the same kilowatt load when the electrodes are positioned for a shorter arc, and a reactance in said electrode circuit.

6. In apparatus for treating metal by the use of an electric arc, the combination of a plurality of relatively movable electrodes, a transformer in circuit with said electrodes and provided with a series of secondary windings, and means for connecting said secondary windings to maintain the kilowatt load of the electrode circuit substantially constant for different adjustments of said electrodes and varying voltages therebetween.

7. In apparatus for treating metal by the use of an electric arc, the combination of a plurality of relatively movable electrodes, a transformer in circuit with said electrodes and provided with a series of secondary windings, and means for connecting said windings in series, series-parallel and parallel, respectively, for maintaining the K. V. A. load of the electrode circuit substantially constant for different currents and lengths of arc.

8. In the manufacture of metals in an arc type electric furnace, the combination with arc electrodes of means for varying the amount of current through the metal bath while maintaining substantially the same K. W. load in the electric circuit.

9. In the manufacture of metals in an arc type electric furnace, the combination with arc electrodes, of electro-magnetically controlled means for varying the amount of current through the metal bath while maintaining substantially the same K. W. load in the electric circuit.

10. In the manufacture of metals in an arc type electric furnace, the combination with arc electrodes, of a kilo-watt regulator for varying the amount of current through the metal bath while maintaining substantially the same kilo-watt load in the electric circuit.

11. In apparatus for treating metal by the use of an arc type electric furnace, the combination with a pair of electrodes, one of which is movable relative to the other, of means for varying the voltage, and means for automatically varying the relative position of the electrodes to keep the K. W. load substantially constant across the electrodes for each change of voltage.

In testimony whereof I affix my signature, in the presence of two witnesses.

REGINALD H. BULLEY.

Witnesses:
H. M. BULLEY,
CHARLES S. ESTABROOK.